United States Patent [19]

Yamazaki et al.

[11] Patent Number: 4,848,862
[45] Date of Patent: Jul. 18, 1989

[54] LASER BEAM SCANNER

[75] Inventors: Kozo Yamazaki, Zama; Toshiyuki Ichikawa, Atsugi; Hiroyuki Ikeda, Yokohama; Takefumi Inagaki; Hirokazu Aritake, both of Kawasaki; Fumio Yamagishi, Ebina, all of Japan

[73] Assignee: Fujitsu Limited, Kawasaki, Japan

[21] Appl. No.: 105,571

[22] Filed: Oct. 8, 1987

[30] Foreign Application Priority Data

Oct. 8, 1986 [JP] Japan .................. 61-239903
Apr. 30, 1987 [JP] Japan .................. 62-107204

[51] Int. Cl.$^4$ .................. G02B 5/32; G02B 26/10
[52] U.S. Cl. .................. 350/3.71; 350/6.8
[58] Field of Search .................. 350/3.71, 6.8

[56] References Cited

FOREIGN PATENT DOCUMENTS 59-202409 11/1984 Japan .................. 350/6.8
61-25119  2/1986 Japan .

Primary Examiner—Bruce Y. Arnold
Assistant Examiner—David J. Edmondson
Attorney, Agent, or Firm—Staas & Halsey

[57] ABSTRACT

A laser beam scanner comprising a scanning window through which scanning beams are emitted, a plurality of hologram layers constituting the scanning window, and an optical system for impinging a laser beam on the hologram layers in a manner such that the trace of the laser beam scanning each hologram layer intersets that of the other hologram layers on the scanning window.

16 Claims, 11 Drawing Sheets

LASER BEAM SCANNER

BACKGROUND OF THE INVENTION (1) Field of the Invention

The present invention relates to a laser beam scanner for reading a bar code or the like by utilizing holograms and laser beams. In particular, it relates to an improved hologram scanner in which the height thereof is reduced.

A hologram scanner comprises holograms assembled in an optical scanning system and includes a laser beam for scanning a predetermined scanning pattern. Such a hologram scanner makes it possible to employ a complicated scanning pattern with a simple optical system and realizes a bar code reader having a high reliability and accuracy.

Hologram scanners are utilized in supermarkets or the like as terminal equipment of a POS (point of sales) system which manages sales data in Real Time by a direct input of the sales data to a computer from each cash register.

At a supermarket, each scanner is placed on a register table with the cash register and a bar code marked on a sales article is read by the scanner while the article is moved thereabove by hand. In such a situation, the bar code reader must be small in size, especially in height, from the view point of the space needed for each scanner, the layout of the scanners, and the operation of the scanner.

Reducing the height of the bar code reader is urgently required at, for example, supermarkets in Europe, where the sales clerk is obliged to sit to operate the bar code reader.

As mentioned above, the hologram scanner comprising holograms and assembled in the optical scanning system is widely utilized as a laser beam scanner which scans a predetermined scanning pattern by a laser beam. The hologram scanner utilizes holograms to simultaneously function as a conventional rotatable polygon mirror and a conventional scanning lens system, thus making it possible to arrange a complicated scanning pattern with a simple optical structure, and to realize a bar code reader having a high reliability and accuracy.

However, there is a need for a further simplification of the structure of the scanner, to reduce the height thereof when the scanner is used as a bar code reader at a supermarket or the like, wherein the scanner is placed on a counter table with a cash register and a bar code marked on a sales article is read by the reader while the article is moved thereabove.

(2) Description of the Related Art

FIG. 10 shows a conventional laser beam scanner according to the prior art and FIG. 11 is a perspective view of a stationary hologram of a prior art.

In FIG. 10, the prior art scanner comprises a laser beam scanning system 10 comprising a motor 11 and a hologram disc 12 having a plurality of hologram facets, a mirror 13, a stationary hologram 2, a window cover 14, and a scanning window 15 (which corresponds to an uncovered portion of the stationary hologram 2 through an opening 14a of the window cover 14). A scanning beam 16 diffracted through the hologram disc 12 is reflected by the mirror 13 and reaches the stationary hologram 2, where the scanning beam 16 is further diffracted and impinged on a bar code 17 marked on an article 1 to be scanned.

Scattered light 18 reflected from the bar code 17 propagates in the direction opposite to the scanning beam 16, as illustrated by dash lines, and reaches the hologram disc 12, where the signal light 18 is diffracted toward an optical detector (not shown) which reads the bar code 17.

The scattered signal light 18 reflected from the bar code is divergent until reaching the stationary hologram 2. However, the reflected light is not overly diverged or widened since the stationary hologram 2 is located in the vicinity of the bar code 17. The scattered divergent light 18 is converted to a parallel plain wave light by the stationary hologram 2 and propagated to the hologram disc 12 without divergence, thus reducing the light receiving area of the hologram disc 12.

The scanning beam 16 scans the surface of the bar code 17 along a scanning line. In order to reliably scan the entire bar code 17 irrespective of the location and movement of the article 1, a plurality of scanning lines are arranged in different directions.

As illustrated in FIG. 11, the stationary hologram 2 comprises a transparent substrate 21 constituting a scanning window 15 and hologram strips 22, 23, and 24 formed on the scanning window 15. A scanning pattern comprising a plurality of scanning lines 220, 230, and 240 corresponding to the hologram strips 22, 23, and 24 and intersecting each other is formed above and apart from the stationary hologram 2.

The problems of the above-mentioned conventional laser beam scanner are explained with reference to FIGS. 12a and 12b and FIGS. 10 and 11.

With the arrangement of FIG. 10, wherein the window cover 14 and the stationary hologram 2 having the hologram strip arrangement of FIG. 11 are arranged in close proximity, the bar code 17 is not always scanned by the scanning beam, depending on the location and direction of movement of the bar code 17 above the scanning window 15. In FIG. 12a for example, the bar code 17 being moved along a dash line ① is read but the bar code being moved along a dash line ② or ③ is not read. This is because, if the bar code 17 is angled as depicted in FIG. 12(a), only the scanning line 240 can pass through the entire length of the bar code from end to end, whereas the scanning lines 220, 230 cannot pass through the entire length of the bar code due to the difference of the inclination angle of the scanning line with respect to the bar code 17. Therefore, the bar code 17 being moved along a dash line ② or ③ cannot be read since the scanning line 240 does not intersect the dash line ② or ③ in a close vicinity above the scanning window.

On the other hand, the scanning lines 220, 230, 240 intersect each other at a level sufficiently away from the scanning window as illustrated in FIG. 12(b). Therefore, the bar code 17 can be read by the scanning line 240 irrespective of the moving line of the bar code 17 (dash line ①, ②, or ③). Therefore, the scanning window must be arranged at the level where the scanning lines intersect each other. The height of the level from the window surface of the stationary hologram 2 is more than 100 mm in the conventional hologram scanner, thus making the height thereof considerably high.

SUMMARY OF THE INVENTION

As mentioned before, the prior art laser beam scanner (hologram scanner) utilizing holograms in the scanning window requires a space of 100 mm or so between the hologram window and the plane where the scanning pattern is formed, which impedes a reduction of the height of the scanner. The present invention makes it possible to eliminate the above-mentioned space and reduce the height thereof by forming a hologram window comprising at least two layers of hologram disposing a transparent plate therebetween, the holograms being arranged to intersect with each other.

In accordance with the present invention, there is provided a laser beam scanner comprising a scanning window through which scanning beams are emitted, a plurality of hologram layers constituting the scanning window, and an optical system for impinging a laser beam on the hologram layers in such a manner that the trace of the laser beam scanning each hologram layer intersects that of the other hologram layers on the window.

DESCRIPTION OF THE PREFERRED EMBODIMENTS

Figure 1:
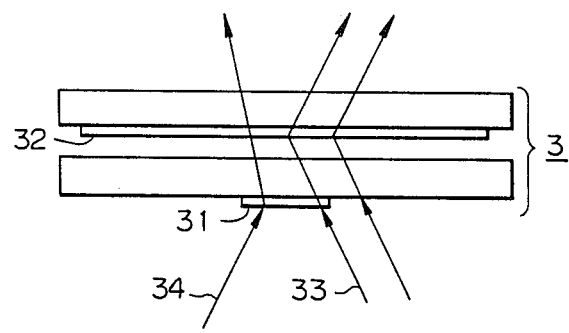
FIG. 1 is a side view of a scanning window of a laser beam scanner according to the present invention, showing the principle of the function thereof.

FIG. 1 illustrates the principle of the function of a scanning window of the laser beam scanner according to the present invention. Note that throughout the drawings, the same or corresponding parts are designated by the same reference numerals.

The problems of the prior art mentioned before are eliminated by a laser beam scanner in FIG. 1 comprising a scanning window comprising a hologram window (3) having at least two hologram strips (31, 32) which intersect each other and an optical system for arranging laser scanning beams (33, 34) to be diffracted by the hologram strips (31, 32). The beams (33, 34) are thereby admitted through the hologram window (3) out of the scanner, and an optical detector installed in the scanner detects scattered signal light propagated back from an article to be read through the hologram strips (31, 32) of the hologram window (3).

If a lower first hologram strip and an upper second hologram strip are simply stacked one above the other, a part of the scanning beam impinged on the upper hologram strip from below is interrupted by the lower hologram strip at the crossing point of the two hologram strips, since the scanning beam is diffracted by the lower hologram strip. Also, the scanning beam formed by the lower hologram strip is diffracted at the crossing point by the upper hologram strip. Therefore, a continuous scanning beam cannot be obtained if the two hologram strips are simply stacked one above the other.

It is possible to read a bar code by using such a discontinuous scanning beam, but desirably, a continuous scanning beam is used. A continuous scanning beam can be obtained by an arrangement wherein the scanning beam (34) diffracted by the lower hologram strip (31) impinges on the upper hologram strip (32) at an incidence angle outside of the Bragg angle, and the scanning beam (33) to be diffracted by the upper hologram strip (32) impinges the lower hologram strip (31) at an incidence angle outside of the Bragg angle. The scanning beam diffracted by the lower hologram strip penetrates the upper hologram strip without being diffracted therethrough, and the scanning beam to be diffracted by the upper hologram strip penetrates the lower hologram strip without being diffracted therethrough.

Figure 10:
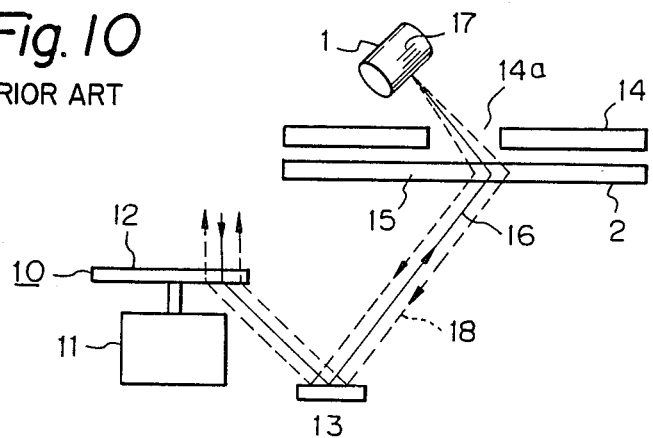
FIG. 10 is a schematic view of a conventional laser beam scanner according to a prior art.
Figure 11:
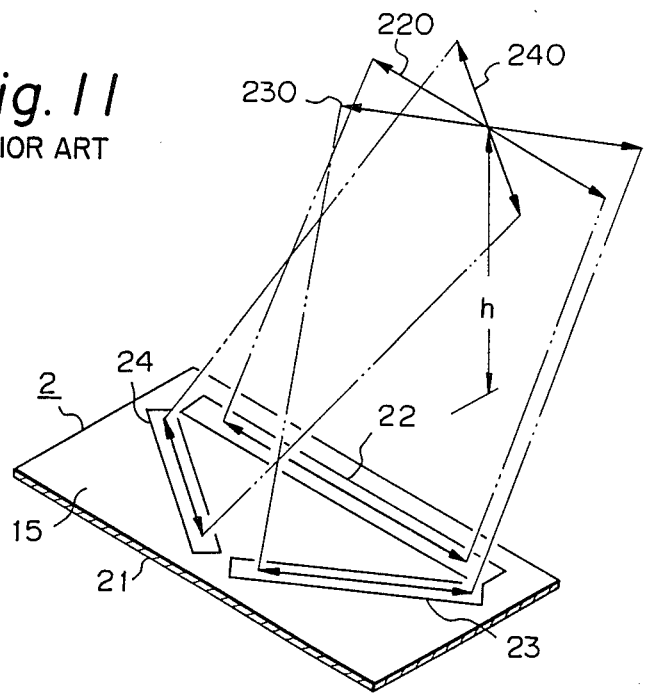
FIG. 11 is a perspective view of a stationary hologram according to the prior art.
Figure 12A:
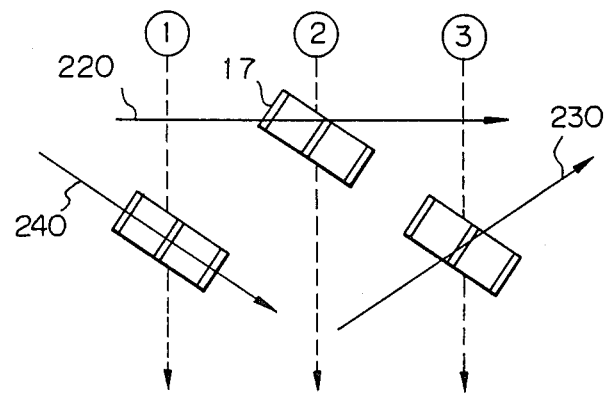
FIGS. 12(a) and 12(b) are views for explaining the problems of and solution to the prior art laser beam scanner.
Figure 12B:
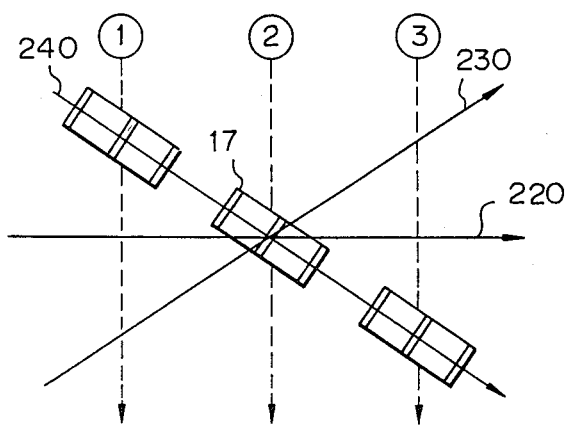

With this arrangement, the height (h), FIG. 10 between the scanning window surface and the level where the scanning lines intersect can be deleted, since a scanning pattern made by scanning lines intersecting each other is formed on the hologram window, instead of forming the pattern at a plane of height (h) above the hologram window surface, as in the prior art. Accordingly, the hologram scanner utilizing the above-mentioned arrangement makes it possible to arrange the window cover very close to the scanning window, thus reducing the height of the scanner.

Figure 14A:
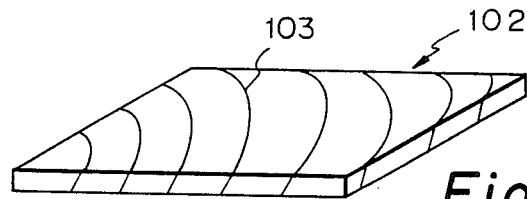
FIGS. 14(a), 14(b), and 14(c) are explanatory views of the Bragg angle.
Figure 14B:
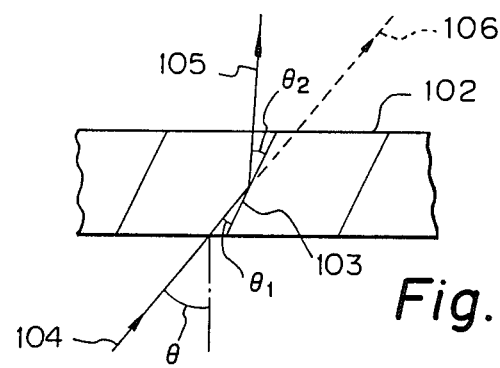
Figure 14C:
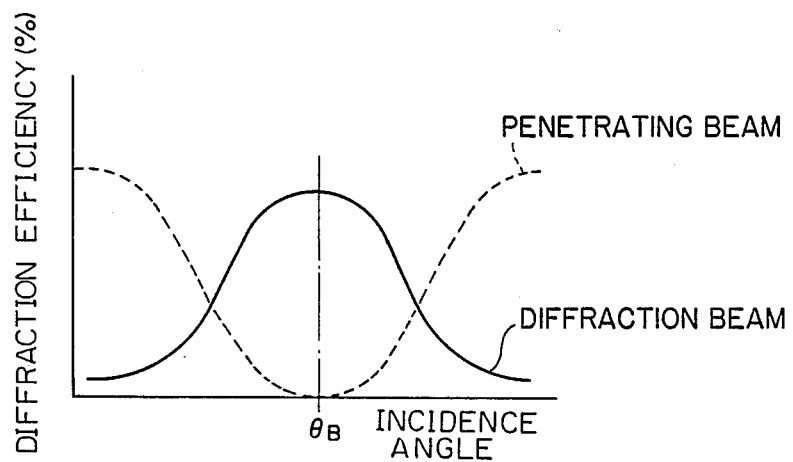

The Bragg angle is explained hereinafter with reference to FIGS. 14(a), 14(b) and 14(c).

Interference fringes 103 are formed in a hologram 102. The diffraction direction of light passing through the hologram 102 is determined in accordance with the pattern of the interference fringes 103. Each interference fringe 103 inclines in a cross section of the hologram 102, as illustrated in FIG. 14(b). When an incidence beam 104 is irradiated on the hologram 102, the beam is diffracted by the interference fringe 103 toward a predetermined direction, as a diffracted beam 105. The direction of the diffracted light 105 depends on the angle of incidence of an incidence beam 104 and the pattern of the fringe on the hologram surface, irrespective of the inclination angle of the interference fringe in the vertical cross section of the hologram. The angle $\theta_2$ of the diffracted beam changes in accordance with the incidence angle $\theta_1$. When the incidence angle $\theta_1$ of the incidence beam 104 is equal to $\theta_2$ the Bragg condition is satisfied, and thus the diffraction efficiency is maximized. The incidence angle $\theta$ of the incidence beam 104 with respect to the hologram 102 when meeting the Bragg condition is called the Bragg angle. Therefore, the Bragg angle $\theta_B$ is defined as the incidence angle of the incidence light onto the hologram with respect thereto when meeting the Bragg condition wherein the incidence angle $\theta_1$ and the diffraction angle $\theta_2$ with respect to the interference fringe are equal.

A part of the incidence beam 104 impinging on the hologram 102 penetrates therethrough, without being diffracted, as a penetration light 106 (shown by a dash line). The amount of penetration light 106 increases in accordance with the distance of the incidence angle $\theta$ of the beam 104 from the Bragg angle $\theta_B$, which is represented in the graph of FIG. 14(c). The abscissa represents the incidence angle of the beam impinging on the hologram with respect thereto, and the ordinate represents the diffraction efficiency. The solid line represents the diffracted beam 105, the luminous amount (intensity) of which is maximized at the Bragg angle $\theta_B$. The dash line represents the penetration light 106, the luminous amount (intensity) of which is almost zero at the Bragg angle $\theta_B$ and increases in accordance with the distance of the incidence angle from the Bragg angle $\theta_B$.

The present invention utilizes the above-mentioned characteristic of the hologram. In accordance with the present invention, a plurality of hologram layers are provided at the scanning window, wherein an incidence beam to be diffracted by a certain hologram layer penetrates the other hologram layers without being diffracted, and the beam diffracted by a certain hologram layer penetrates the other hologram layers without being diffracted by distancing the incidence angle of the beam with respect to the other hologram layers away from the Bragg angle. Practically, it is sufficient to distance the incidence angle away from the Bragg angle so that the diffracted beam amount ratio is about one tenth of the incidence beam amount.

Figure 2:
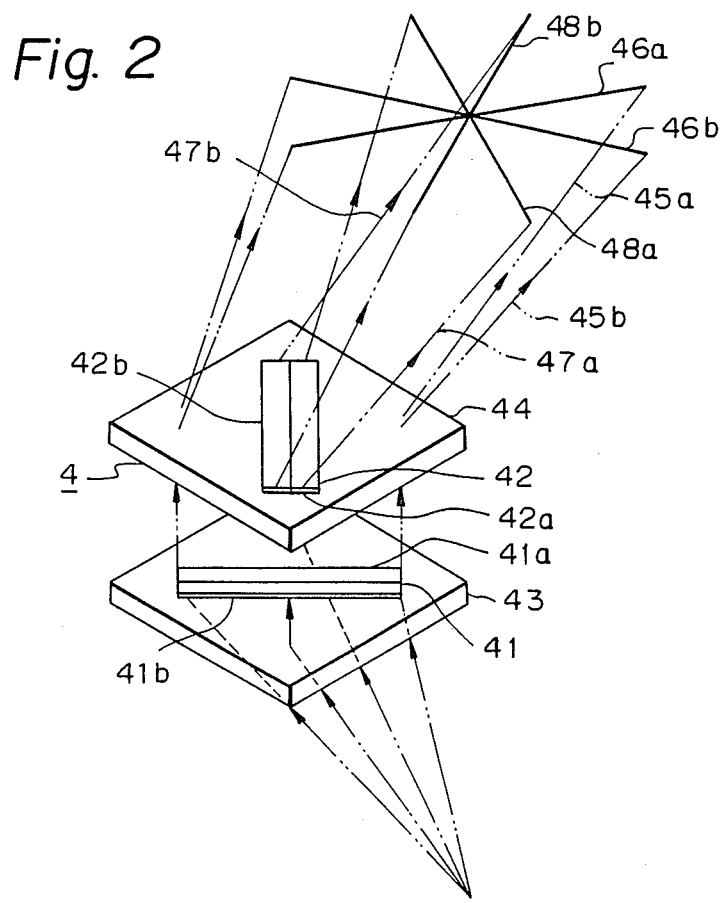
FIG. 2 is a perspective view of a first embodiment of the present invention.
Figure 3:
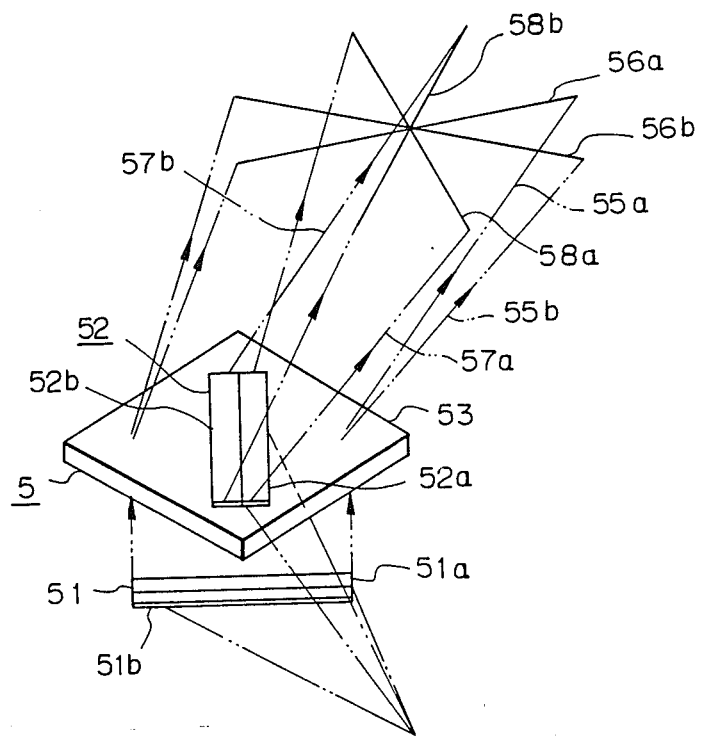
FIG. 3 is a perspective view of a second embodiment of the present invention.
Figure 4:
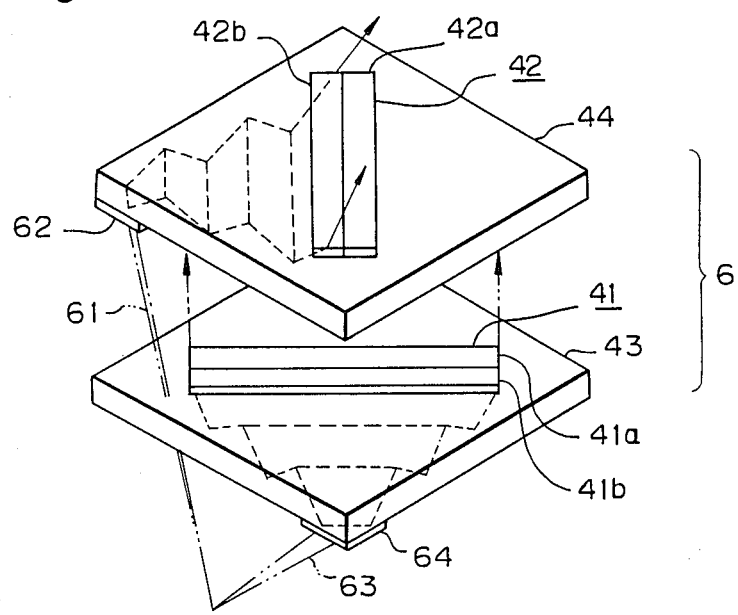
FIG. 4 is a perspective view of a third embodiment of the present invention.
Figure 5:
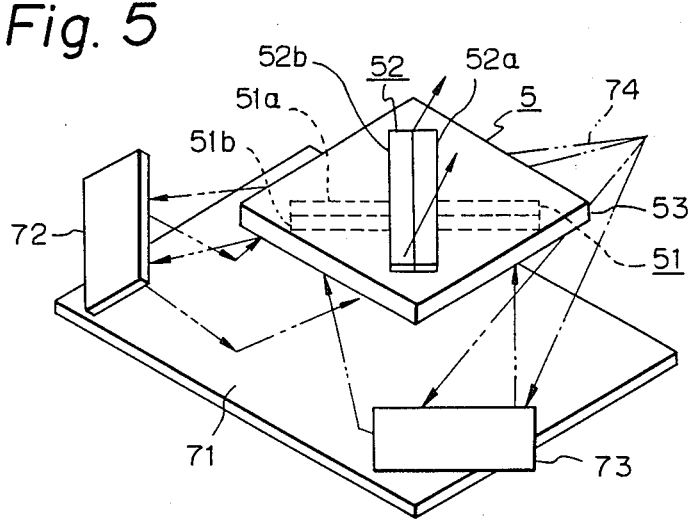
FIG. 5 is a perspective view of a fourth embodiment of the present invention.

Embodiments of the present invention will be described hereinafter with reference to the drawings. FIG. 2 is a perspective view of a first embodiment of the present invention, FIG. 3 is a perspective view of a second embodiment of the present invention, FIG. 4 is a perspective view of a third embodiment of the present invention, and FIG. 5 is a perspective view of a fourth embodiment of the present invention.

In FIG. 2, a hologram window 4 comprises a first hologram strip 41 formed on a transparent substrate 43 such as a glass plate, and a second hologram strip 42 formed on a transparent substrate 44 such as a glass plate. The first hologram strip 41 comprises two hologram strips 41a and 41b having different diffraction directions. The second hologram strip 42 comprises two hologram strips 42a and 42b having different diffraction directions. The hologram window 4 is assembled by fixing the two transparent substrates 43 and 44 together in such a manner that the hologram strips 41 and 42 intersect each other.

With such a hologram window 4, a scanning beam irradiated to the hologram strip 41a is diffracted thereby and propagated therefrom as a diffracted scanning beam 45a, the direction of which is outside the Bragg angle with respect to the upper hologram strip 42. Therefore, the scanning beam 45a diffracted by the lower hologram strip 41a penetrates the transparent substrate 44 and the hologram strip 42 formed thereon without being diffracted, thus tracing a continuous scanning line 46a. Similarly, a scanning beam irradiated to the hologram strip 41b is diffracted thereby and propagated therefrom as a diffracted scanning beam 45b, the direction of which is outside the Bragg angle with respect to the upper hologram strip 42. Therefore, the scanning beam 45b diffracted by the hologram strip 41b penetrates the transparent substrate 44 and the hologram strip 42 formed thereon without being diffracted, thus tracing a continuous scanning line 46b.

On the other hand, a scanning beam, the direction of which is outside the Bragg angle with respect to the hologram strip 41, penetrates the lower substrate 43 and the hologram strip 41 formed thereon without being diffracted therethrough and impinges on one of the upper hologram strips 42, for example, the hologram strip 42a. The scanning beam impinged on the hologram 42a is diffracted thereby and propagated therefrom as a diffracted scanning beam 47a which traces a continuous scanning line 48a. Similarly, a scanning beam, the direction of which is outside the Bragg angle with respect to the hologram strip 41, penetrates the transparent substrate 43 and the hologram strip 41 formed thereon without being diffracted and impinges on the other hologram strip 42b. The scanning beam impinged on the hologram strip 42b is diffracted thereby and propagated therefrom as a diffracted scanning beam 47b which traces a continuous scanning line 48b.

In FIG. 3, a hologram window 5 comprises a transparent substrate 53 such as a glass plate, a first hologram strip 51 coated on the lower surface of the transparent substrate 53, and a second hologram strip 52 coated on the upper surface of the transparent substrate 53. The first hologram strip 51 comprises two hologram strips 51a and 51b having different diffraction directions. The second hologram strip 52 comprises two hologram strips 52a and 52b having different diffraction directions. Each of the hologram strips 41, 42, 51, and 52 may be a phase-type hologram or a surface relief-type hologram.

A scanning beam impinged on the hologram strip 51a is diffracted thereby and propagated therefrom as a diffracted scanning beam 55a, the direction of which is outside the Bragg angle with respect to the upper hologram strip 52. Therefore, the scanning beam 55a diffracted by the hologram strip 51a penetrates the transparent substrate 53 and the upper hologram strip 52 without being diffracted by the hologram strip 52, and traces a continuous scanning line 56a. Similarly, a scanning beam impinged on the other lower hologram 51b is diffracted by the hologram 51b and propagated therefrom as a diffracted scanning beam 55b, the direction of which is outside the Bragg angle with respect to the upper hologram strip 52. Therefore, the scanning beam diffracted by the lower hologram strip 51b penetrates the transparent substrate 53 and the upper hologram strip 52 without being diffracted, and traces a continuous scanning line 56b.

On the other hand, a scanning beam impinged on the hologram window 5 with an incidence angle outside the Bragg angle with respect to the hologram strip 51, penetrates the hologram strip 51 and the transparent substrate 53 without being diffracted by the hologram strip 51 and impinges on one of the hologram strips 52a. The scanning beam is diffracted by the hologram strip 52a and propagated therefrom as a diffracted scanning beam 57a which traces a continuous scanning line 58a. Similarly, another scanning beam impinged on the hologram window 5 with an incidence angle outside the Bragg angle with respect to the hologram strip 51 penetrates the transparent substrate 53 and the hologram strip 51 without being diffracted by the hologram strip 51 and impinges on the other one of the upper hologram strips 52b. The scanning beam is diffracted by the hologram strip 52b and propagated therefrom as a diffracted scanning beam 57b which traces a continuous scanning line 58b.

The hologram scanner provided with the above-mentioned hologram window 4 or 5 does not require the height (h) for arranging a scanning pattern of crossed scanning lines above the hologram window, thus making it possible to reduce the height of the scanner.

Note in FIG. 10 that the bar code 17 is scanned by the scanning beam 16 by moving the laser beam spot by the optical scanning system 10 and irradiating the moving scanning beam onto the surface of the bar code 17 via the mirror 13 and the stationary hologram 2. Therefore, the range of movement of the scanning beam spot is widened to resemble a sector along the beam path. Therefore, the scanning range of the beam spot at the bar code 17 is narrowed in accordance with a shortening of the distance from the scanning system 10 to the bar code 17, if the scanning angle of the beam at the scanning system 10 is the same.

Therefore, the attempt to reduce the height of the scanner by shortening the distance between the stationary hologram and the bar code 17 is limited, since a predetermined and sufficient distance is required between the optical scanning system 10 and the bar code 17. The embodiments illustrated in FIG. 4 and FIG. 5 make it possible to further reduce the height of the scanner without shortening the distance between the optical scanning system 10 and the bar code 17.

In FIG. 4, a hologram window 6 comprises a first lower hologram strip 41 formed on a lower transparent substrate 43 and a second upper hologram strip 42 formed on an upper transparent substrate 44, similar to the embodiment of FIG. 2. The first hologram strip 41 comprises two hologram strips 41a and 41b having different diffraction directions. The second hologram strip 42 comprises two hologram strips 42a and 42b having different diffraction directions. A hologram 62 for introducing the scanning beam 61 into the upper transparent substrate 44 is provided at a corner thereof. Also, a hologram 64 for introducing the scanning beam 63 into the lower transparent substrate 43 is provided at a corner thereof.

The scanning beam 61 is introduced into the transparent substrate 44 through the hologram 62 and propagated therein, repeating the total reflections therein to the hologram strip 42a or 42b. During the propagation within the transparent substrate 44, the scanning range of movement of the scanning beam 61 is widened. Also, the scanning beam 63 is introduced into the transparent substrate 43 through the hologram 64 and propagated therein, repeating the total reflections therein to the hologram strip 41a or 41b. During the propagation within the transparent substrate 43, the scanning range of movement of the scanning beam 63 is widened. Namely, the distance required for widening the scanning range, i.e., the range of movement of the beam spot, is obtained within each of the transparent substrates, wherein the scanning beam propagates repeated total reflections, thus making it possible to further reduce the height of the scanner, when compared to the afore-mentioned embodiments, while retaining the advantageous features thereof.

In FIG. 5, a hologram window 5 comprises a first hologram strip 51 formed on a lower surface of a transparent substrate 53, and a second hologram strip 52 formed on an upper surface of the transparent substrate 53. The hologram strip 51 comprises two hologram strips 51a and 51b having different diffraction directions. Also, the second hologram strip 52 comprises two hologram strips 52a and 52b having different diffraction directions. A floor mirror 71 and a plurality of side mirrors 72 and 73 are disposed below the hologram window 5. A scanning beam 74, which is approximately parallel to the hologram window 5, impinges on the side mirrors 72 and 73, is reflected by each of the mirrors 72 and 73, further reflected by the floor mirror 71, and then propagated to the hologram strip 51 or 52.

By disposing the side mirrors 72 and 73 at a proper distance from the optical scanning system, it becomes possible to further reduce the height of the scanner without shortening the distance between the optical scanning system 10 and the bar code 17, while retaining the advantageous features of the embodiment of FIG. 3.

A laser beam scanner to which the hologram window in accordance with the present invention is applied is described hereinafter with reference to FIGS. 6 to 9.

Figure 6:
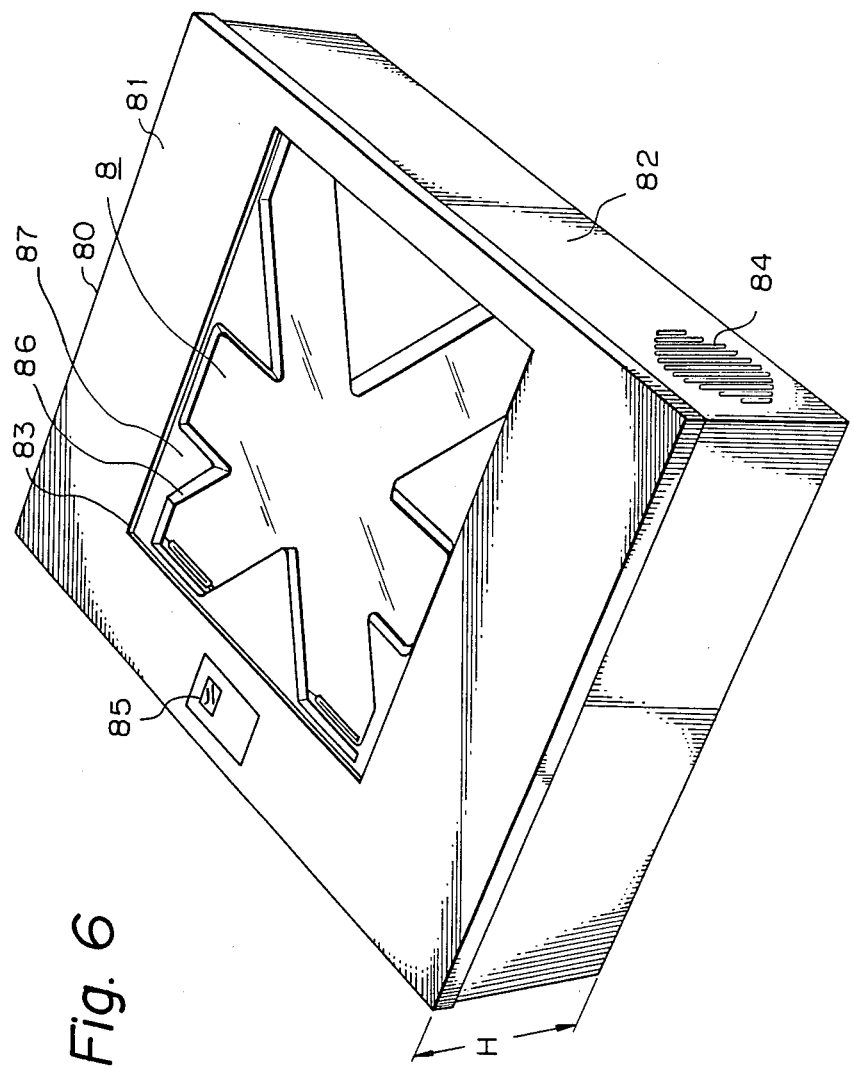
FIG. 6 is an external perspective view of a laser beam scanner according to the present invention.
Figure 7:
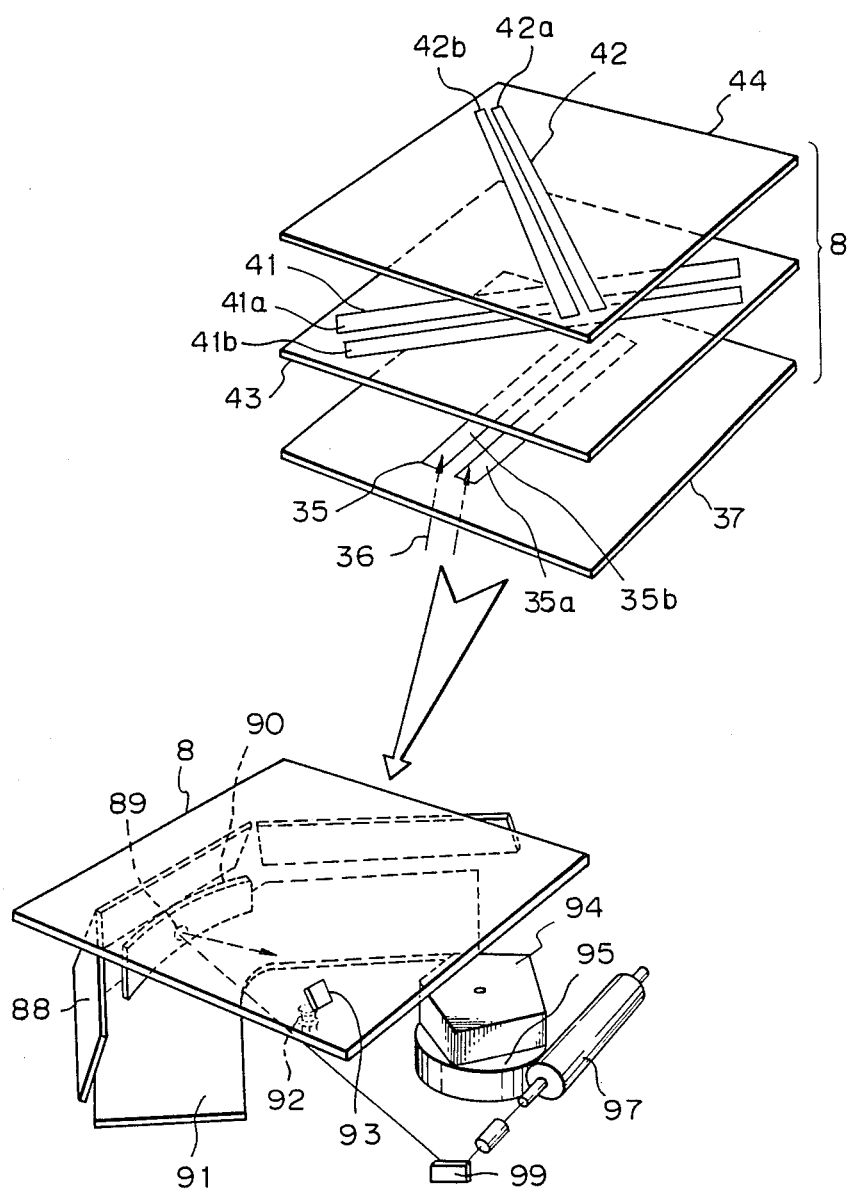
FIG. 7 is a partial disassembled view of the laser beam scanner of FIG. 6.
Figure 8:
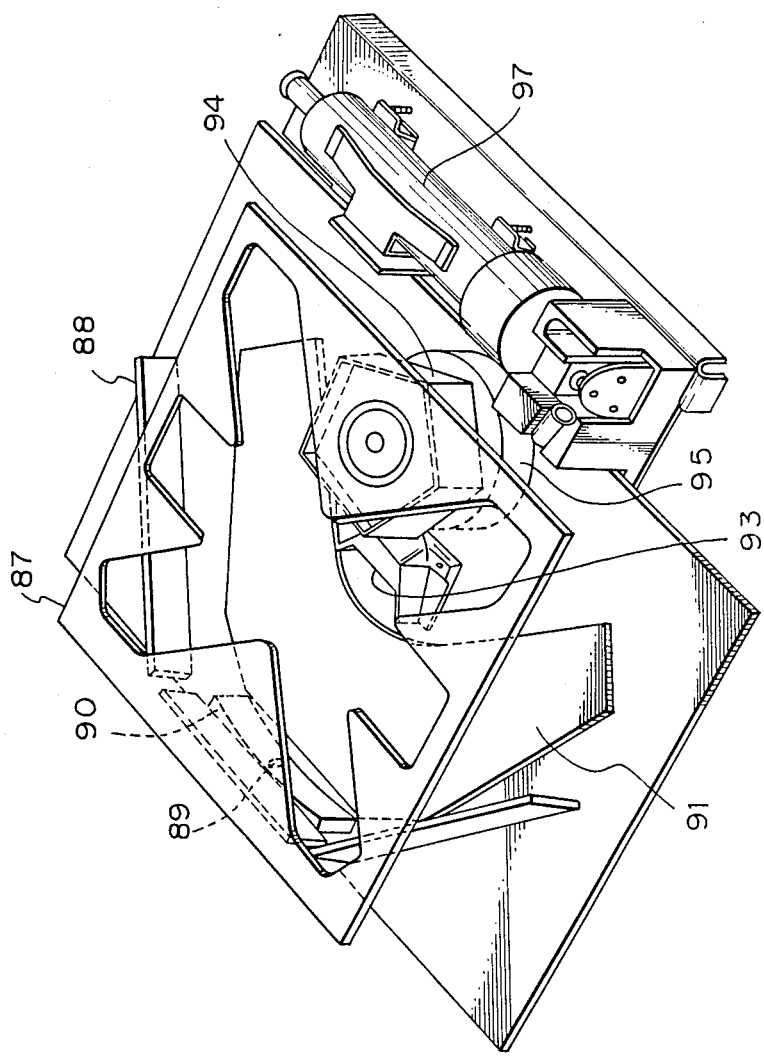
FIG. 8 is a perspective view of an assembled optical system of the laser beam scanner of FIG. 6.

FIG. 6 is a perspective external view of a laser beam scanner in accordance with the present invention, FIG. 7 is a partial disassembled view of the scanner of FIG. 6, FIG. 8 is a perspective assembled view of the optical system of the scanner of FIG. 6, and FIG. 9 is a schematic view of the beam path of the scanner of FIG. 6.

In FIG. 6, a plastic case 80 comprises an upper cover 81 and a lower box 82. A rectangular opening 83 is formed in the upper cover 81, and a vent 84 formed by a plurality of slits for a cooling fan, is provided on one side surface of the lower box 82. A confirmation lamp for displaying that the bar code was read or not is provided on the upper cover 81. A window cover 87 having an opening shaped like an asterisk (*) is disposed inside the upper cover 81 at the location of the opening 83. A hologram window of the present invention is disposed inside the window cover 87.

The inventors have thus created a laser beam scanner with a case 80 having a very compact size, in which the height is below 85 mm (actually 79 mm) and the longitudinal × lateral dimension is less than 250 mm × 310 mm (actually 222 mm × 305 mm). The case 80 houses the hologram window 8, an optical scanning means described later, and a power source for the optical means.

As illustrated in FIG. 7, the hologram window 8 is a three-layer structure comprising a transparent substrate 37 such as a glass plate having a hologram strip 35 formed thereon, in addition to the two layers of FIG. 2, i.e., a transparent substrate 43 having a hologram strip 41 (41a and 41b) formed thereon and a transparent substrate 44 having a hologram strip 42 (42a and 42b) formed thereon. The three layers of the substrate 37 are adhered together. The numeral 35 designates the hologram strip as a whole, which comprises two hologram strips 35a and 35b having different diffraction directions. The hologram may be a phase type hologram or a surface relief type hologram.

In the stacked state of the hologram window 8, the hologram strips 41, 42, and 35 intersect each other in the shape of an asterisk (*). If a scanning beam 36 is diffracted by the hologram strip 35, the direction of the diffracted beam is outside the Bragg angle with respect to the other two hologram strips 41 and 42. Also, a scanning beam to be diffracted by either the hologram strip 41 or 42 impinges on the hologram strip 35 at an incidence angle outside the Bragg angle with respect to the hologram strip 35.

The hologram window 8, as illustrated in a lower part of FIG. 7, is disposed on an optical system comprising three side mirrors 88, a concave mirror 90 having an aperture 89, a floor mirror 91, an optical detector 92, a light collector mirror 93 for guiding light to the optical detector 92, a rotational polygon mirror 94 having five sides, and a motor 95 for driving the polygon mirror 94.

FIG. 8 illustrates a window cover 87 disposed on the hologram window 8 (not shown in FIG. 8), and an He-Ne laser source 97 mounted on a base on which aforementioned optical system is also mounted together with the power and drive circuits (not shown) for driving the laser source 97 and the motor 95.

A tiny mirror 98 is disposed behind the concave mirror 90 and facing the aperture 89 thereof, as illustrated in FIG. 9. The optical system, the laser source 97, and the power circuit are assembled and housed within the case 80 of FIG. 6, and constitute a hologram scanner in accordance with the present invention.

Figure 9A:
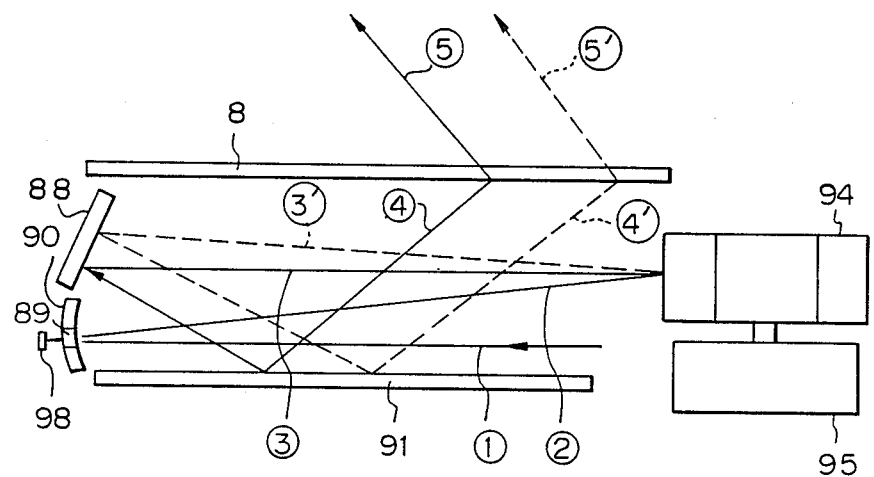
FIGS. 9(A) and 9(B) are explanatory side views of the optical system of the laser beam scanner of FIG. 6, showing the beam paths thereof.
Figure 9B:
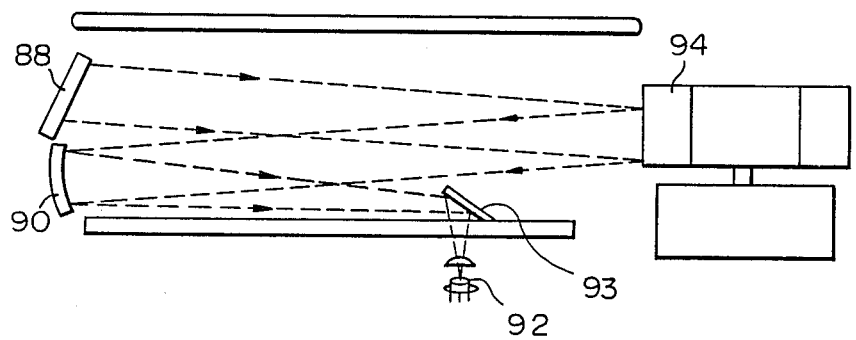

The beam path mode of the laser beam scanner according to the present invention is described hereinafter with reference to FIGS. 9(A) and 9(B).

The laser source 97 emits a laser beam which is reflected by the mirror 99 (FIG. 7) and propagated toward the concave mirror 90 from the side of the polygon mirror 94. As illustrated in FIG. 9(A), the laser beam ① impinges on the tiny mirror 98 through the aperture 89 of the concave mirror 90, and is reflected by the tiny mirror 98 behind the concave mirror 90 and propagated to the polygon mirror 94 through the aperture 89 as a reflected beam ②. The reflected beam ② impinges on the side surfaces of the polygon mirror The beam ② is reflected by the mirror of each side of the polygon mirror 94 and propagated therefrom to the side mirrors 88 as a scanning beam ③ or ③', according to the inclination and rotation of the mirror surface to which the beam impinges. Each scanning beam ③, ③' moves across the three side mirrors 88 (FIG. 7) and is reflected by the side mirrors 88 and the floor mirror 91 and propagated toward the hologram window 8 as a reflected beam ④, ④', which is diffracted by the hologram window and propagated therefrom in a predetermined direction as a scanning beam ⑤, ⑤'. The scanning beams ⑤ and ⑤' form a predetermined scanning pattern.

Scattered signal light from the bar code is propagated in the direction opposite to the scanning beam direction back to the side mirrors 88 through the hologram 8 and the floor mirror 91 along the light path ⑤, ⑤'→④, ④'. The scattered signal light is reflected by the side mirrors 88 and propagated to the polygon mirror 94, where the signal light is reflected to the inner mirror surface of the concave mirror 90, as illustrated in FIG. 9(B). The signal light reflected by the concave mirror 90 is converged toward the optical detector 92 via the mirror 93 and detected by the optical detector as signal light from the bar code.

A compact hologram scanner having a low height can be realized by the above-mentioned arrangement.

As mentioned above, in accordance with the present invention, it is possible to provide a hologram scanner enabling a reduction of the height of a bar code reader.

Figure 13:
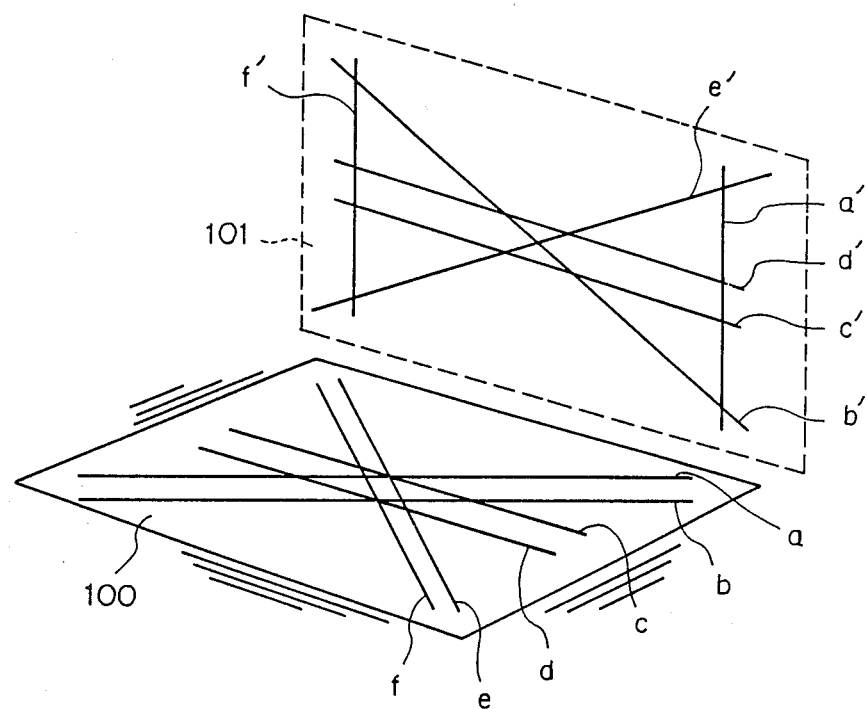
FIG. 13 is an explanatory view of scanning beams of the laser beam scanner according to the present invention.

An example of the scanning pattern by the diffracted beam in accordance with the present invention is illustrated in FIG. 13. A scanning window 100 (corresponding to the hologram window 8 of FIG. 6) of a laser beam scanner comprises three layers of holograms stacked one above the other through a transparent substrate disposed between the layers. Each hologram layer comprises two parallel hologram strips disposed side by side. The hologram strips of one layer intersect the hologram strips of the other layers in the center area of the scanning window 100. A laser beam scans the six hologram strips stacked in the three layers in a predetermined order, in accordance with the arrangement of the optical scanning system, and traces six scanning lines (a) to (f) corresponding to six hologram strips on the window 100. The scanning beam diffracted by one hologram layer is not diffracted by the other two hologram layers and is emitted from the window in a predetermined direction as a continuous scanning beam. The diffracted scanning beams emitted from the window 100 trace scanning lines (a') to (f') on an imaginary projection plane 101, each corresponding to the scanning lines (a) to (f) on the window 100. For example, the scanning beam (a) diagonally crossing the window 100 is diffracted by the hologram strip and traces a vertical scanning line (a') on the vertical plane 101. With this arrangement of the scanning pattern, it is possible to illuminate and read the bar code above the scanning window by at least one of the scanning beams, irrespective of the height, location, and direction of movement of the bar code.

We claim:

1. A laser beam scanner generating a laser beam and scanning beams, said laser beam scanner comprising:
   a scanning window through which the scanning beams are emitted;
   a plurality of overlapping hologram layers arranged within said scanning window diffracting the scanning beams, said plurality of hologram layers diffracting each of the scanning beams not more than one; and
   optical means for impinging the laser beam upon said hologram layers, producing a trace of the laser beam scanning each of said hologram layers and emitting the scanning beams from said scanning window, which beams then intersect.

2. A laser beam scanner according to claim 1, wherein said plurality of hologram layers comprises three hologram layers, each one of said three hologram layers comprising two parallel hologram strips, said two parallel hologram strips of one of said hologram layers overlapping and intersecting said two parallel hologram strips of another of said hologram layers.

3. A laser beam scanner generating a laser beam and scanning beams, said laser beam scanner comprising:
   a scanning window through which the scanning beams are emitted;
   a plurality of hologram layers arranged within said scanning window diffracting the scanning beams, one of said plurality of hologram layers diffracting ones of the scanning beams such that a scanning beam impinging upon and being diffracted by one of said plurality of hologram layers, impinges upon any other one of said plurality of hologram layers with an incidence angle outside of the Bragg angle and penetrates therethrough without being diffracted; and
   optical means for impinging the laser beam upon said hologram layers, producing a trace of the laser beam scanning each of said hologram layers and emitting the scanning beams from said scanning window which beams then intersect.

4. A laser beam scanner generating laser scanning means, said laser beam scanner comprising:
   a hologram window having first and second holograms intersecting each other and diffracting the laser scanning beams, the laser scanning beams diffracted by any one of said first and second holograms, impinging upon and penetrating through any one of said first and second holograms without being diffracted, said laser beam scanner propagating the laser scanning beams through said hologram window to impinge upon an object to be read, and receiving a scattered light signal reflected from the object propagating back into said laser beam scanner through said first and second holograms of said hologram window; and an optical detector installed within said laser beam scanner detecting the scattered light signal.

5. A laser beam scanner according to claim 4, wherein each of said first and second holograms is formed as a strip.

6. A laser beam scanner according to claim 5, wherein said first and second hologram strips are formed on individual transparent substrates, respectively, said substrates superposed an adhered together making said first and second hologram strips overlap and intersect each other.

7. A laser beam scanner according to claim 5, wherein said first and second hologram strips are formed on upper and lower surfaces of a transparent substrate, individually, said first and second hologram strips overlapping and intersecting each other.

8. A laser beam scanner according to claim 5, further comprising a third hologram strip provided in addition to said first and second hologram strips within said hologram window and diffracting the laser scanning beams, the laser scanning beams diffracted by said third hologram strip impinging upon said first and second hologram strips at an incidence angle outside of the Bragg angle with respect to said first and second hologram strips and the laser scanning beams diffracted by any one of said first and second hologram strips impinging upon said third hologram strip at an incidence angle outside of the Bragg angle with respect to said third hologram strip.

9. A laser beam scanner according to claim 8, wherein said first, second and third hologram strips of said hologram window are formed on individual transparent substrates, respectively, the substrates being superposed and adhered together making said first, second, and third hologram strips overlap and intersect without being aligned with each other.

10. A laser beam scanner according to claim 5, further comprising:
a laser beam source providing a laser beam;
a rotational polygon mirror tracing the laser beam from said laser beam source in a plane approximately parallel to said hologram window and propagating the laser beam as the laser scanning beams;
a first side mirror disposed facing said polygon mirror receiving and reflecting the laser scanning laser beams from said polygon mirror toward a floor side of said laser beam scanner; and
deviation means including a floor mirror approximately parallel to said hologram window for receiving and reflecting the laser scanning beams from said first side mirror toward said hologram window.

11. A laser beam scanner according to claim 10, wherein said deviation means comprises:
a concave mirror having an aperture and an inner mirror surface and disposed near said first side mirror; and
a second side mirror disposed behind said concave mirror and facing the aperture, receiving the laser beam from said laser beam source and passing the laser beam through the aperture of said concave mirror impinging upon said second side mirror behind said concave mirror and reflecting from said second side mirror, said second side mirror reflecting the laser beam back through the aperture to said hologram window via said polygon mirror, said first side mirror and said floor mirror, the reflected laser beam emitting from said hologram window as the laser scanning beams, said laser beam scanner receiving the scattered light signal reflected from the object propagating back through said hologram window, said floor mirror, said first side mirror and said polygon mirror receiving reflecting and providing the scattered light signal to the inner mirror surface of said concave mirror, said concave mirror receiving, converging and reflecting the scattered light signal toward said optical detector.

12. A laser beam scanner according to claim 5, wherein said hologram window comprises a rectangular box-shaped case having a height of less than 85 mm, a lateral dimension of less than 250 mm and a longitudinal dimension of less than 310 mm, said case including means for emitting the laser scanning beams and said optical detector.

13. A laser beam scanner generating laser scanning beams, said laser beam scanner comprising:
a hologram window having first and second holograms intersecting each other, said first and second holograms being formed as strips and diffracting the laser scanning beams, the laser scanning beams diffracted by one of said first and second holograms propagating from said laser beam scanner through said hologram window to impinge on an object to be read, said laser beam scanner receiving a scattered light signal reflected from the object propagating back into said laser beam scanner through said first and second holograms of said hologram window, said first and second holograms being arranged such that one of the scanning beams diffracted by said first hologram impinges upon said second hologram at an incidence angle outside the Bragg angle with respect to said second hologram, and another of the scanning beams diffracted by said second hologram impinges upon said first hologram at an incidence angle outside the Bragg angle with respect to said first hologram; and
an optical detector installed within said laser beam scanner detecting the scattered light signal.

14. A laser beam scanner comprising a hologram window (3) which comprises a least two hologram strips (31, 32) intersecting each other, wherein the scanning beam passage is arranged in a manner such that a scanning beam (34) diffracted by the first hologram strip (31) impinges on the second hologram strip (32) with an incidence angle outside the Bragg angle with respect to the second hologram strip (32), and a scanning beam (33) to be diffracted by the second hologram strip (32) impinges on the first hologram strip (31) with an incidence angle outside the Bragg angle with respect to the first hologram strip (31).

15. A laser beam scanner comprising a case having a scanning window through which scanning beams are emitted, the case including: a laser beam source; and optical scanning means for generating the scanning beams from said laser beam source and emitting the scanning beams out of the scanner, wherein the height of the case is less than 85 mm.

16. A laser beam scanner generating a laser beam and scanning beams, said laser beam scanner comprising:
- a scanning window through which the scanning beams are emitted;
- a plurality of hologram layers arranged within said scanning window diffracting the scanning beams, said plurality of hologram layers including three hologram layers, each of said three hologram layers comprising two parallel hologram strips, said two parallel hologram strips of one of said three hologram layers overlapping and intersecting said two parallel hologram strips of another of said three hologram layers, ones of said plurality of hologram layers diffracting ones of the scanning beams such that a scanning beam impinging upon and being diffracted by one of said plurality of hologram layers impinges upon any other one of said plurality of hologram layers with an incidence angle outside of the Bragg angle and penetrates therethrough without being diffracted; and
- optical means for impinging the laser beam upon said hologram layers, producing a trace of the laser beam scanning each of said hologram layers and emitting the scanning beams from said scanning window, which beams then intersect.

* * * * *

UNITED STATES PATENT AND TRADEMARK OFFICE
CERTIFICATE OF CORRECTION

PATENT NO. : 4,848,862

DATED : July 18, 1989

INVENTOR(S) : Kozo Yamazaki et al.

It is certified that error appears in the above-identified patent and that said Letters Patent is hereby corrected as shown below:

Col. 1, line 63, before "through" s/b --exposed--.

Col. 3, line 66, "admitted" s/b --emitted--.

Col. 9, line 28, after "mirror" s/b --94.--;

line 38, after "window" s/b --8,--.

Col. 10, line 31, "one" s/b --once--;

line 36, ", which beams then intersect" s/b --which intersect.--;

line 50, "one" s/b --ones--;

line 62, delete "beams then".

Col. 12, line 53 "a" s/b --at--.

Col. 14, line 13, ", which beams then" s/b --which--.

Signed and Sealed this

Nineteenth Day of June, 1990

*Attest:*

HARRY F. MANBECK, JR.

*Attesting Officer*        *Commissioner of Patents and Trademarks*